United States Patent
Sebastian et al.

(10) Patent No.: US 10,194,691 B2
(45) Date of Patent: Feb. 5, 2019

(54) NON-COMBUSTING SMOKING ARTICLE WITH THERMOCHROMATIC LABEL

(71) Applicant: R.J. Reynolds Tobacco Company, Winston-Salem, NC (US)

(72) Inventors: Andries Don Sebastian, Clemmons, NC (US); Craig T. Demarest, Oakridge, NC (US); Jarkko Tuominen, Espoo (FI); Annukka Kokkonen, Espoo (FI); Antti Sunnari, Espoo (FI); Sanna Uusitalo, Espoo (FI); Olli-Heikki Huttunen, Espoo (FI)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 279 days.

(21) Appl. No.: 15/164,421

(22) Filed: May 25, 2016

(65) Prior Publication Data
US 2017/0340008 A1  Nov. 30, 2017

(51) Int. Cl.
*A24F 47/00* (2006.01)
*A24D 1/02* (2006.01)
*G09F 3/00* (2006.01)
*C09D 11/50* (2014.01)
*G09F 23/00* (2006.01)

(52) U.S. Cl.
CPC .............. *A24F 47/006* (2013.01); *A24D 1/02* (2013.01); *A24D 1/025* (2013.01); *A24F 47/008* (2013.01); *C09D 11/50* (2013.01); *G09F 3/0291* (2013.01); *G09F 23/00* (2013.01)

(58) Field of Classification Search
CPC ................................ A24D 1/025; C09D 11/50
See application file for complete search history.

(56) References Cited

U.S. PATENT DOCUMENTS

| | | | |
|---|---|---|---|
| 2,032,695 A | 3/1936 | Gimera et al. | |
| 2,510,449 A | 6/1950 | Williams et al. | |
| 2,737,037 A | 3/1956 | Zellweger | |
| 3,551,092 A | 12/1970 | Masson | |
| 3,576,761 A * | 4/1971 | Davis | B44F 1/00 |
| | | | 252/299.5 |
| 3,756,766 A | 9/1973 | Green | |
| 3,766,946 A | 10/1973 | Corarg | |
| 3,829,737 A | 8/1974 | Johnsson | |

(Continued)

FOREIGN PATENT DOCUMENTS

| | | |
|---|---|---|
| EP | 1 808 087 | 7/2007 |
| EP | 2 550 879 | 1/2013 |

(Continued)

*Primary Examiner* — Anthony Calandra
(74) *Attorney, Agent, or Firm* — Womble Bond Dickinson (US) LLP

(57) ABSTRACT

A smoking article is disclosed herein. The smoking article includes a shell defining an interior space, a consumable substance within the interior space, a heat source effective to increase the temperature of at least a portion of the shell, and a label attached to at least a portion of the shell. The label includes a base film, a cover film, and a temperature dependent material disposed between the base film and the cover film. The temperature dependent material is configured to transition between a first appearance and a second appearance responsive to the increase of the temperature of at least a portion of the shell.

21 Claims, 6 Drawing Sheets

(56) References Cited

U.S. PATENT DOCUMENTS

| | | | |
|---|---|---|---|
| 4,070,912 A | | 1/1978 | McNaughtan et al. |
| 4,205,060 A | * | 5/1980 | Monsimer ............ A61K 9/5026 |
| | | | 264/4.1 |
| 4,222,734 A | | 9/1980 | Nolf |
| 4,487,570 A | | 12/1984 | Lowenthal |
| 4,692,590 A | | 9/1987 | Spector |
| 4,895,511 A | | 1/1990 | Schmid |
| 4,954,077 A | | 9/1990 | Tamura |
| 5,059,852 A | | 10/1991 | Meury |
| 5,135,795 A | | 8/1992 | Gregory et al. |
| 5,154,192 A | * | 10/1992 | Sprinkel ................ A24D 1/12 |
| | | | 131/194 |
| 5,308,240 A | | 5/1994 | Lowenthal |
| 5,482,373 A | | 1/1996 | Hutchinson |
| 5,649,554 A | | 7/1997 | Sprinkel et al. |
| 5,848,596 A | | 12/1998 | Zelenik |
| 6,478,575 B2 | | 11/2002 | Sher |
| 6,632,082 B1 | | 10/2003 | Smith |
| 6,676,405 B2 | | 1/2004 | Sewalt |
| 6,726,470 B1 | | 4/2004 | Meister |
| 6,902,392 B2 | | 6/2005 | Johnson |
| 7,479,098 B2 | | 1/2009 | Thomas et al. |
| 7,753,056 B2 | | 7/2010 | Borschke et al. |
| 7,836,897 B2 | | 11/2010 | Borschke et al. |
| 7,946,293 B2 | | 5/2011 | Gerardi |
| 8,464,726 B2 | | 6/2013 | Sebastian et al. |
| 8,469,035 B2 | | 6/2013 | Banerjee et al. |
| 8,616,217 B2 | | 12/2013 | Tsurizumi et al. |
| 2007/0215167 A1 | | 9/2007 | Llewellyn Crooks et al. |
| 2009/0217864 A1 | * | 9/2009 | Stewart ................ G01K 11/12 |
| | | | 116/216 |
| 2010/0221207 A1 | | 9/2010 | Watkins et al. |
| 2012/0042885 A1 | | 2/2012 | Stone et al. |
| 2012/0091218 A1 | | 4/2012 | Mikkelsen et al. |
| 2012/0315588 A1 | | 12/2012 | Kondrat |
| 2013/0133675 A1 | | 5/2013 | Shinozaki et al. |
| 2013/0146075 A1 | | 6/2013 | Poget et al. |
| 2013/0157922 A1 | | 6/2013 | Mikkelsen et al. |
| 2013/0202788 A1 | | 8/2013 | Mikkelsen et al. |
| 2014/0026904 A1 | | 1/2014 | Monty et al. |
| 2015/0223520 A1 | | 8/2015 | Phillips et al. |
| 2015/0272222 A1 | | 10/2015 | Spinka et al. |

FOREIGN PATENT DOCUMENTS

| | | |
|---|---|---|
| JP | H05 45451 U | 6/1993 |
| WO | WO 99/44447 | 9/1999 |
| WO | WO 2011/042354 | 4/2011 |
| WO | WO 2012-164077 | 12/2012 |
| WO | WO 2013-098380 | 7/2013 |
| WO | WO 2013-098405 | 7/2013 |
| WO | WO 2013-098410 | 7/2013 |
| WO | WO 2013-104914 | 7/2013 |
| WO | WO 2013-120849 | 8/2013 |
| WO | WO 2013-120854 | 8/2013 |

* cited by examiner

NON-COMBUSTING SMOKING ARTICLE WITH THERMOCHROMATIC LABEL

FIELD OF DISCLOSURE

The present disclosure is directed toward smoking articles, generally smoking articles that do not require burning of tobacco. More specifically, the present disclosure relates to labels associated with the smoking articles.

BACKGROUND

Smoking articles, such as cigarettes, cigars and pipes traditionally create smoke by burning tobacco. Traditional cigarettes, cigars and pipes rely upon the combustion of the tobacco leaves associated with the product.

Many smoking devices have been proposed through the years as improvements upon, or alternatives to, smoking products that require combustion of tobacco for use. Many of those devices purportedly have been designed to provide the sensations associated with cigarette, cigar or pipe smoking, but without delivering considerable quantities of incomplete combustion and pyrolysis products that result from the burning of tobacco. To this end, there have been proposed numerous smoking products, flavor generators and medicinal inhalers that utilize electrical energy to vaporize or heat a volatile material, or attempt to provide the sensations of cigarette, cigar or pipe smoking without burning tobacco to a significant degree. See, for example, the various alternative smoking articles, aerosol delivery devices and heat generating sources set forth in the background art described in U.S. Pat. No. 7,726,320 to Robinson et al. and U.S. Pat. No. 8,881,737 to Collett et al., which are incorporated herein by reference. See also, for example, the various types of smoking articles, aerosol delivery devices and electrically-powered heat generating sources referenced by brand name and commercial source in U.S. Pat. Pub. No. 2015/0216232 to Bless et al., which is incorporated herein by reference. Additionally, various types of electrically powered aerosol and vapor delivery devices also have been proposed in U.S. Pat. Pub. Nos. 2014/0096781 to Sears et al. and 2014/0283859 to Minskoff et al., as well as U.S. patent application Ser. No. 14/282,768 to Sears et al., filed May 20, 2014; Ser. No. 14/286,552 to Brinkley et al., filed May 23, 2014; Ser. No. 14/327,776 to Ampolini et al., filed Jul. 10, 2014; and Ser. No. 14/465,167 to Worm et al., filed Aug. 21, 2014; all of which are incorporated herein by reference.

Other aerosol generating smoking articles have also been known for many years that rely upon heat generated by a fuel source, such as charcoal, instead of being electrically powered. Examples of this type of product can be found in U.S. Pat. No. 2,907,686 to Siegel; U.S. Pat. Nos. 3,258,015 and 3,356,094 to Ellis et al; U.S. Pat. No. 3,738,374 to Bennett; U.S. Pat. Nos. 3,943,941 and 4,044,777 to Boyd et al; U.S. Pat. No. 4,286,604 to Ehretsmann et al; U.S. Pat. No. 4,326,544 to Hardwick et al; U.S. Pat. No. 4,340,072 to Bolt et al; U.S. Pat. No. 4,928,714 to Shannon and U.S. Pat. No. 5,076,292 to Sensabaugh, Jr. et al.

SUMMARY

Embodiments of the present disclosure include aerosol generating smoking articles with labels configured to change appearance. In many embodiments, the appearance change is a reversible change influenced by the temperature of the label. During use the label is intended to change temperature due to the use of heating elements within the smoking articles. These labels may be provided for aesthetic or informational purposes. For example, the labels may be considered to act as a warning that portions of the smoking article are hot, or as confirmation that appropriate and/or necessary heating is occurring. The labels are generally intended for use on products that do not rely upon tobacco combustion for intended use. Further, the thermochromatic ingredient portion of the label may be substantially fully contained, to minimize ingestion by the user of the smoking article.

The present disclosure describes a smoking article. The smoking article includes a shell defining an interior space, a consumable substance within the interior space, a heat source effective to increase the temperature of at least a portion of the shell, and a label attached to at least a portion of the shell. The label includes a base film, a cover film, and a temperature dependent material disposed between the base film and the cover film. The temperature dependent material is configured to transition between a first appearance and a second appearance responsive to the increase of the temperature of at least a portion of the shell.

In some embodiments, the temperature dependent material may be a reversible thermochromatic ink or a reversible phase change material that may transition from a colored, opaque cool state to a substantially transparent warm state to effect the change in appearance. In other embodiments, the present disclosure includes a heat-not-burn cigarette. The cigarette may comprise a heating element configured to generate heat, a filter configured for insertion into a user's mouth, tobacco leaves disposed between the heating element and the filter, wrapping configured to surround the heating element and the tobacco leaves, and a label attached to the wrapping. The label may comprise a base film, a cover film, and a heat-responsive material disposed between the base film and the cover film. The heat-responsive material is adapted to change an appearance of the label responsive to the generated heat.

BRIEF DESCRIPTION OF THE DRAWINGS

Figure 1:
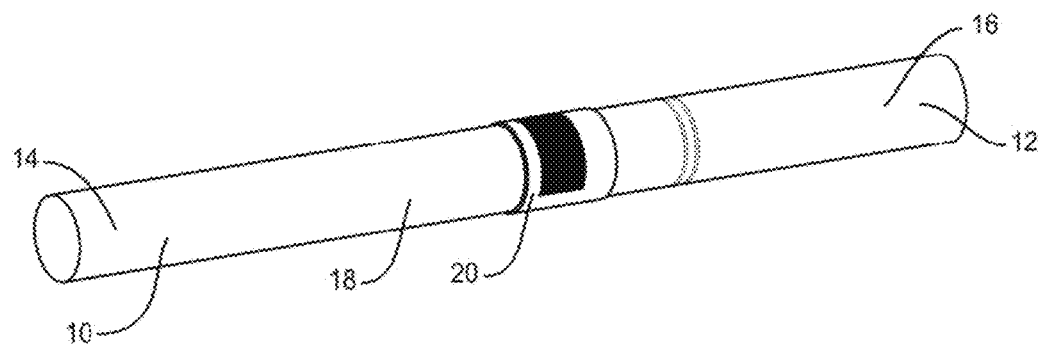

Having thus described the disclosure in the foregoing general terms, reference will now be made to the accompanying drawings, which are not necessarily drawn to scale, and wherein:

FIG. 1 shows a smoking article at a low temperature with a label according to one embodiment of the present disclosure.

Figure 2:
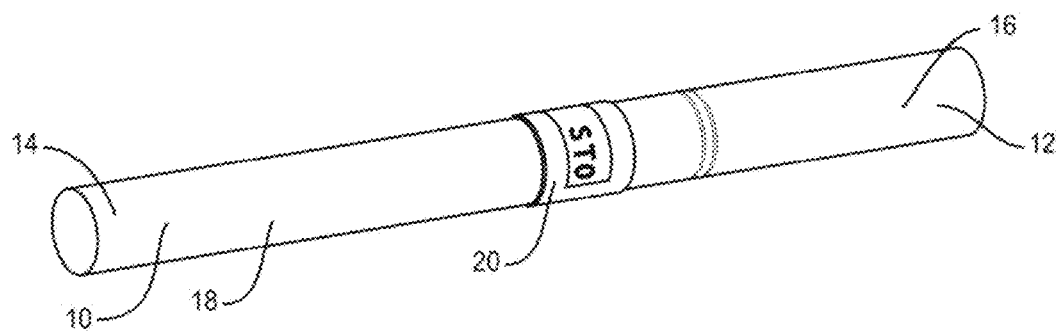

FIG. 2 shows the smoking article at a high temperature with the label of FIG. 1.

Figure 3:
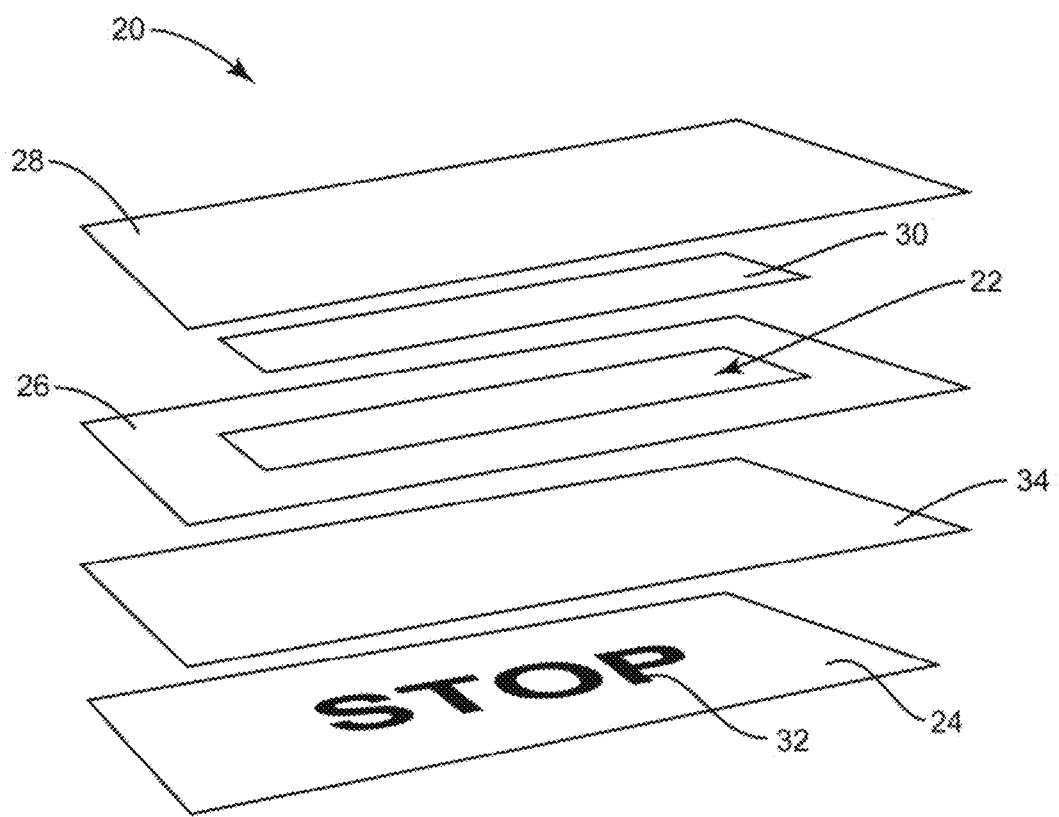

FIG. 3 shows an exploded view of the label according to one embodiment of the present disclosure.

Figure 4:
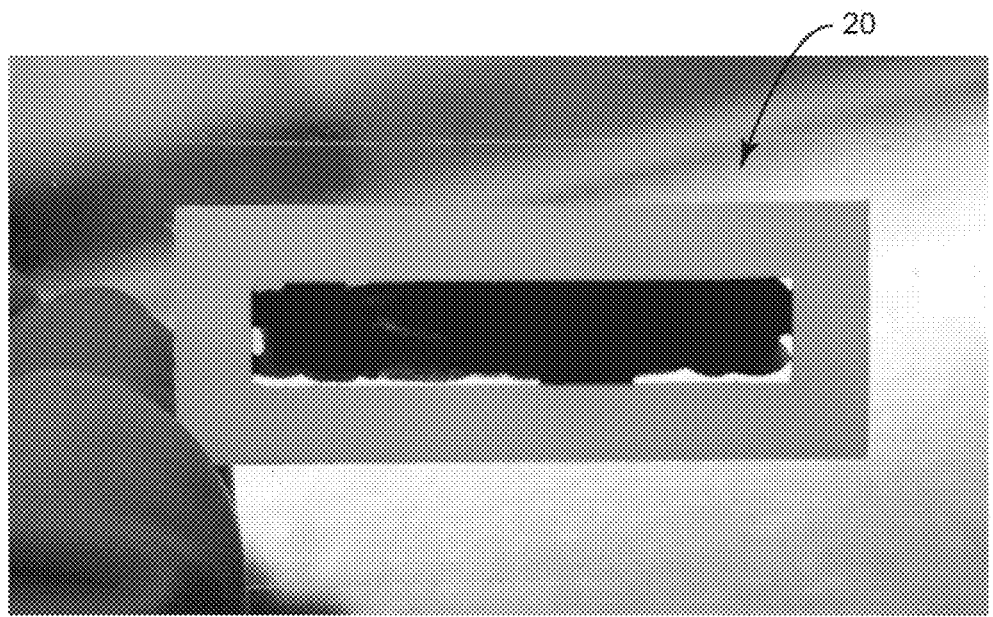
Figure 5:

FIGS. 4 and 5 show a first example of a label below and above a transition temperature of 47° C., respectively.

Figure 6:
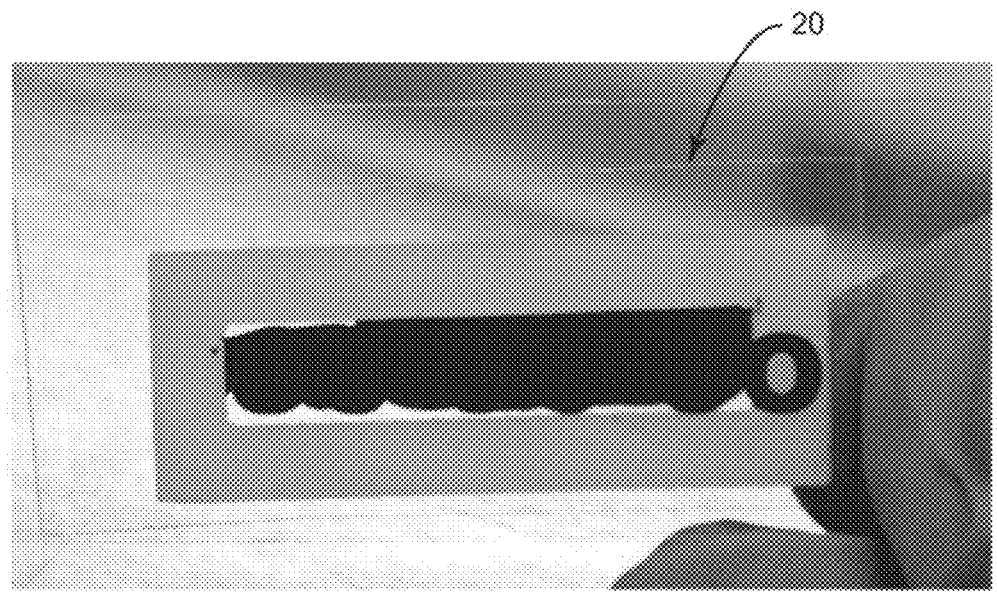
Figure 7:

FIGS. 6 and 7 show a second example of a label below and above a transition temperature of 47° C., respectively.

Figure 8:
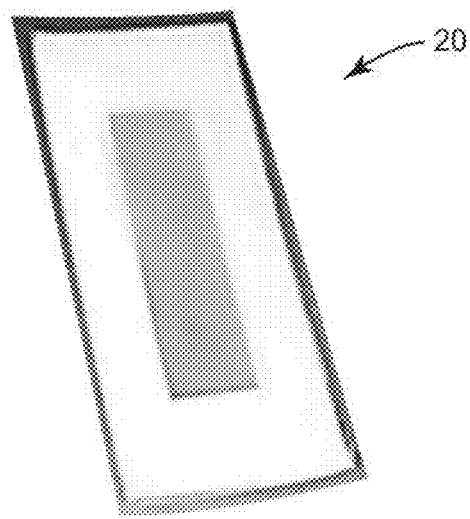
Figure 9:
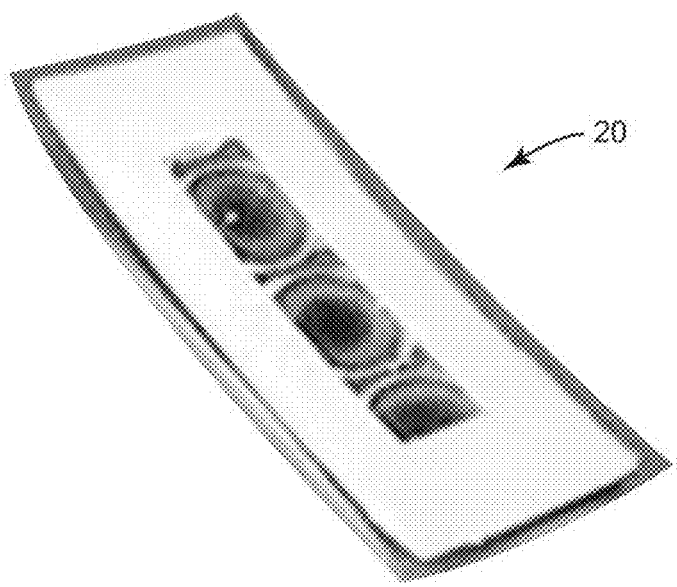

FIGS. 8 and 9 show a third example of a label below and above a transition temperature of 55° C., respectively.

Figure 10:
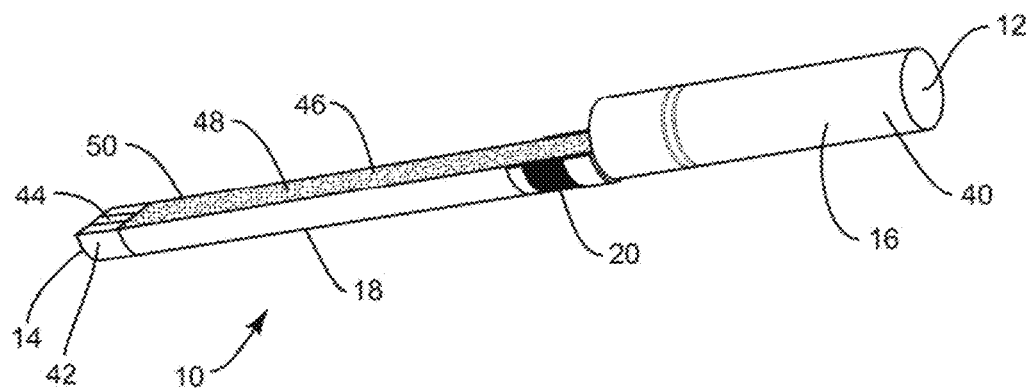

FIG. 10 shows a cross section of the smoking article of FIG. 1.

Figure 11:
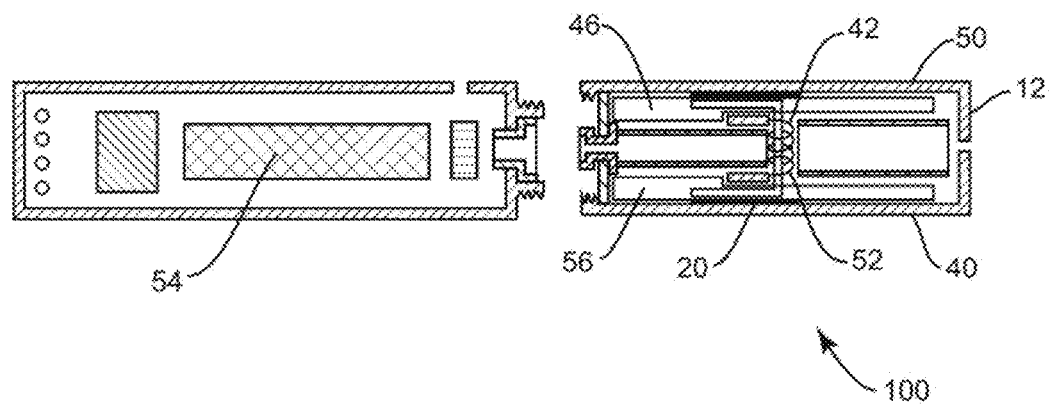

FIG. 11 shows a cross section of an alternative smoking article with a label according to embodiments of the present disclosure.

DETAILED DESCRIPTION

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

FIG. 1 shows a smoking article 10 having a mouth end 12 and a heating end 14. A filter 16 may be present at the mouth end 12 of the smoking article 10. In the illustrated embodiment, the smoking article 10 has an exterior defined by a wrapping of traditional cigarette paper 18. A label 20 is provided around a circumference of the smoking article 10. The label 20 may fully or partially surround the circumference of the smoking article 10. In some embodiments the label 20 may extend along a longitudinal axis of the smoking article 10. In yet other embodiments, the label 20 may be shaped like a point upon the exterior of the wrapping paper 18. The smoking article 10 may be provided with a single label 20 or may include a plurality of labels spaced around the circumference or along the length of the smoking article.

The label 20 is configured to alter its appearance based upon a change in temperature. In FIG. 1, the label 20 has a first appearance before the smoking article is in-use. FIG. 1 represents the first appearance as a generally uniform, opaque appearance. The first appearance is not limited to the illustrated appearance but could take several forms as discussed further below. Prior to use, the label 20 and the smoking article 10 have a temperature generally equal to the ambient environment, such as room temperature or the body temperature of the user's hand that holds the smoking article. During use, a heat source generally causes at least some portions of the smoking article 10 to increase in temperature. If the temperature of the label 20 increases past a given threshold or transition temperature, the label 20 will present a second appearance. An example of a second appearance is shown in FIG. 2 as the appearance of text where a uniform appearance was previously present. The appearance shown in FIG. 2 is provided as an example only and is not intended to limit the scope of the second appearance. The second appearance may be substantially any appearance distinct from the first appearance that is caused by an increase in temperature at or near the label 20.

In many embodiments, the change from the first appearance to the second appearance is substantially reversible. If the temperature at or near the label 20 drops from above the threshold temperature to a temperature below the threshold, the label may revert back from the second appearance to the first appearance. The change in appearance should occur relatively quickly, within a few minutes, if not a few seconds.

The threshold temperature at which the label 20 switches from the first appearance to the second appearance should be between about 37° C. and about 65° C. This range positions the transition temperature above room temperature and above the usual temperature of a human body, which may be present when the smoking article 10 is held in the hand or is placed within a user's mouth. Preferably, the label 20 will transition in appearance before the temperature of the label or the smoking article 10 approaches dangerous levels. A preferred range of transition temperatures may be between about 45° C. and about 55° C. The transition temperature may also be referred to as the step temperature, the clearing temperature, or the threshold temperature.

FIG. 3 shows an exploded view of a first embodiment of the label 20. The label 20 may include a one or more appearance changing portions or windows 22. The example shown includes a single window 22. A label 20, however, may be provided as a unit with a plurality of distinct color-changing portions or windows 22 spaced apart along the length of the smoking article 10. With such an embodiment, the color-changing portions may progressively change as the smoking article 10 heats up from the heating end 14 toward the mouth end 12.

In embodiments where the label 20 is wrapped around the circumference of the smoking article 10, the label 20 may have a length of about 27 mm to wrap around a traditionally sized cigarette of approximately 8-9 mm in diameter. The width of the label 20 may in be in range of about 2 mm to about 70 mm, preferably between about 4 mm and about 20 mm. The label 20 may have a thickness of less than about 300 um and preferably less than 200 um to avoid significantly increasing the outer diameter of the smoking article 10. A thickness of greater than 50 um may be expected for ease of mass production of the labels 20.

In some embodiments all portions of the label 20 may be food grade, biodegradable, compostable, or combinations thereof. In some embodiments, portions of the label 20 that are not food grade may be substantially fully contained to avoid significant contact with or ingestion by the user of the smoking article 10. The label 20 should be constructed to maintain a shelf life of approximately one-year.

As seen in FIG. 3, the label 20 may include a base layer 24, an intermediate layer 26 and a cover layer 28. The base and cover layers 24, 28 may generally comprises transparent thin plastic films, such as, but not limited to cellulose acetate foil (such as Clarifoil®), polyethylene terephthalate (PET) foil (such as Lumirror™), polylactic acid (PLA) film or transparency film (such as Canon® CLT-500). The intermediate layer 26 may be present to bind the base and cover layers 24, 28 together. A suitable material for the intermediate layer 26 may include, but is not limited to double-sided adhesive tapes such as 3M® 9965. The material of the intermediate layer 26 may form a border for the window 22.

The label 20 also includes a temperature dependent material 30, also referred to as a heat-responsive material, provided between the base layer 24 and the cover layer 28. The temperature dependent material 30 may be surrounded by the intermediate layer 26. The label 20 utilizes the behavior of the temperature dependent material 30 with a changing temperature to shift appearances.

In one embodiment, the temperature dependent material 30 includes thermochromatic ink positioned on the base layer 24. Thermochromatic ink may also be referred to as thermochromic ink. The thermochromatic inks may be virtually any color when cool, including but not limited to black and red. When heated above the transition temperature these thermochromatic inks generally become transparent. A transition from colored to colorless as the temperature increases is also possible. Examples of thermochromatic ink include leuco dyes and liquid crystal based inks. Specific examples include, but are not limited to, Chameleon® Flexo ink slurry and binder with a transition temperature of 47° C.; Chromazone® Flexo ink slurry and binder with a transition temperature of 49° C. available from TMC Hallcrest; and thermochromatic ink with a 47° C. transition available from Akzo Nobel.

Example 1

In a first example, a permanent ink layer 32 is applied to the base layer 24. The general construction of Example 1 is shown in FIG. 3. As used herein, "permanent ink" refers to ink that is substantially temperature-independent when cured. In other words, "permanent ink" is ink that does not change color due to changes in temperature, permanent ink is not thermochromatic. The permanent ink layer 32 may be printed in the form of text, an image, or a patter. Then, a layer of temperature dependent material 30, such as a thermochromatic ink layer, is applied at least partially over the permanent ink layer 32. Because the thermochromatic ink is substantially opaque and colored when the ink and its surrounding temperature are below the transition temperature, the temperature dependent material 30 least partially obstructs the content of the permanent ink layer 32.

When the temperature rises above the transition temperature, the thermochromatic ink becomes transparent, and the permanent ink layer 32 becomes visible to a viewer. In some embodiments, the color of the permanent ink may be selected as the same color as the color of the thermochromatic ink when below the transition temperature. However, the use of unique colors or several colors for each ink layer is also possible.

Photographs of a prototype label according to Example 1 are seen in FIGS. 4 and 5, which show the label 20 below and above the transition temperature respectively. The prototype according to Example 1 was constructed as follows:

Base layer 24: A 127 μm thick transparent layer made from CLT-500 available from Canon.
Permanent ink layer 32: Text printed on the base layer 24 with a laser printer.
Intermediate layer 26: A 51 μm thick 9965 white spacer tape available from 3M®.
Temperature dependent material 30: Chameleon® Water Based Flexo Ink slurry and binder with a +47° C. transition temperature available from TMC Hallcrest, Product code 1210-47-03-1. The thermochromatic ink was manually dispensed over the permanent ink layer 32 within the window 22 formed by the spacer tape of the intermediate layer 26.
Cover layer 28: A 115 μm thick transparent cellulose acetate foil.

Example 2

In a second example, the permanent ink layer 32 is applied to the cover layer 28. A layer of temperature dependent material 30, such as a thermochromatic ink layer, was applied at least partially over the base layer 24 behind the permanent ink layer 32. The color of the permanent ink was selected to be the same as the color of the temperature dependent material when below the transition temperature. Because the inks are the same color at temperatures below the transition temperature, the ability to perceive the permanent ink is significantly limited. When the label 20 is heated above the transition temperature, the change in color of the thermochromatic ink provides a contrast that increases the visibility of permanent ink layer 32, thereby changing the overall appearance of the label. When the label 20 cools back to a temperature below the transition temperature, the temperature dependent material 30 transitions again within a few seconds, resulting in the label having a first appearance once again.

Photographs of a prototype label according to Example 2 are seen in FIGS. 6 and 7, which show the label 20 below and above the transition temperature respectively. The prototype according to Example 2 was constructed as follows:

Base layer 24: A 115 μm thick transparent cellulose acetate foil.
Intermediate layer 26: A 51 μm thick 9965 white spacer tape available from 3M®.
Temperature dependent material 30: Akzo Nobel Inks, Thermochromatic Black 47 with a transition temperature of approximately +47° C. The ink was manually dispensed over the base layer 24 within the window 22 formed by the spacer tape of the intermediate layer 26.
Cover layer 28: A 127 μm thick transparent layer made from CLT-500 available from Canon.
Permanent ink layer 32: Text printed on the cover layer 28 with a laser printer.

The label 20 according to some embodiments uses a temperature dependent material 30 other than thermochromatic inks. In one embodiment, paraffin wax or other phase change material is used as the temperature dependent material 30. The paraffin wax can be formulated to have a melting, i.e. a transition temperature, between about 37° C. and about 65° C., for example 55° C. The paraffin wax has an appearance below the transition temperature of a translucent or opaque solid. The paraffin wax melts at the transition temperature into a substantially transparent liquid. Therefore, the paraffin wax provides a potentially suitable temperature dependent material 30 that provides for an appearance change of the label 20 as the temperature of the label crosses the transition temperature. The paraffin wax is also expected to solidify when the temperature falls back below the transition temperature, making the paraffin wax suitable for a reversible label 20.

Labels 20 that use a temperature dependent material 30 that melts are not limited to paraffin wax, but may include other similar materials that provide a substantially transparent liquid at temperatures above a transition temperature and an opaque or highly translucent solid at temperatures below the transition temperature. Again the transition temperature of suitable materials would fall in or near the range of about 37° C. to about 65° C. Example materials include, but are not limited to, hydrogenated coconut oil, bee's wax, other waxes, gums, pectins or fatty acid esters.

The label 20 may include additional structures or be subject to additional processes to further enhance the appearance of the label at temperatures above and/or below the transition temperature. A metallic coating 34 (FIG. 3) may be applied to one or more surfaces of one or more of the base and cover layers 24, 28 to provide the label 20 with an aesthetically pleasing metallic appearance in one or both of the first appearance and the second appearance.

In some embodiment, diffraction gratings may be created on one or both of the base layer 24 and the cover layer 28. By adding diffraction gratings to these generally transparent films, light interacting with the films may be split into its color components to produce an added rainbow effect to the label 20.

In some embodiments, one or both of the base layer 24 and the cover layer 28 may be hot embossed to add structures that may be visible as part of the label 20 in at least one of the first appearance with temperatures below the transition temperature and the second appearance with temperatures above the transition temperature. The structures formed by the embossing process may form a visual pattern in the label 20, such as a honeycomb pattern.

Example 3

Photographs of a prototype label according to Example 3 are seen in FIGS. 8 and 9, which show the label 20 below and above the transition temperature respectively. The construction of Example 3 is not limited to creating the change in appearance shown. The transition of a label 20 according to Example 3 may also present other text, symbols, colors, patterns, etc. The prototype according to Example 3 was constructed as follows:

Base layer 24: A 95 µm thick cellulose acetate foil with a diffractive grating. A 50 nm thick aluminum coating was provided on the base layer 24.

Intermediate layer 26: A 150 µm thick 9965 white double-sided spacer tape available from 3M®.

Temperature dependent material 30: A 150 µm thick layer of paraffin wax with a melting temperature of 55° C.

Cover layer 28: A 30 µm thick transparent layer of cellulose acetate.

Turning to FIG. 10, a smoking article 10 is shown in cross section according to a first embodiment. As mentioned above, the labels 20 of the present disclosure may be most suitable for smoking articles 10 that do not typically require combustion of tobacco. The smoking article 10 of FIG. 10 may be an example of a heat-not-burn cigarette. The smoking article 10 has a filter 16 at the mouth end 12 to provide a mouth piece 40 configured for insertion into a user's mouth. The heating end 14 is provided with a heating element 42, also referred to as a heat source, configured to produce heat effective to increase the temperature of the label 20 and cause a change in appearance of the label. The heating element 42 may be a non-electric heating element such as charcoal or other carbon filament 44. The carbon filament 44 may be subject to an open flame to begin the heating process. A consumable substance 46, such as shredded tobacco leaves 48 may be disposed between the heating element 42 and the mouth piece 40. A shell 50, such as the wrapping papers 18, may be configured to at least partially surround the heating element 42, the mouth piece 40 and the consumable substance 46, thereby forming an interior space within the shell. The label 20 is then shown attached to an outside of the shell 50 in a location corresponding with the consumable substance 46. In one example, the label 20 may be applied to the shell 50 with an adhesive.

Turning to FIG. 11, a smoking article 100 is shown in cross section according to a second embodiment. As mentioned above, the labels 20 of the present disclosure may be most suitable for smoking articles that do not typically require combustion of tobacco. The smoking article 100 of FIG. 11 may be an example of an aerosol generator or e-cigarette. The smoking article 100 has a mouth piece 40 at the mouth end 12, configured for insertion into a user's mouth. The smoking article 100 includes a heating element 42 configured to generate heat. The heating element 42 may be an electric heating element 52 configured to generate heat through the use of electrical resistance. Such an electric heating element 52 couples with a current source, such as a battery 54. A consumable substance 46, such as liquid aerosol precursor, may be stored in a reservoir 56. A shell 50 may be configured to at least partially surround the heating element 42, the mouth piece 40 and the consumable substance 46. The label 20 is then shown attached to an inside of the shell 50 in a location corresponding with the heating element 42. In one example, the label 20 may be applied to the shell 50 with an adhesive. At least a portion of the shell 50 may be transparent to allow the label 20 to be visible. When the electric heating element 52 increases in temperature, the label 20 may transition from a first appearance to a second appearance.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. A smoking article comprising:
   a shell defining an interior space;
   a consumable substance within the interior space;
   a heat source effective to increase the temperature of at least a portion of the shell; and
   a label attached to at least a portion of the shell, the label comprising:
   a base film,
   a cover film,
   a temperature dependent material disposed between the base film and the cover film, and
   a permanent ink layer applied to at least one of the base film and the cover film in the form of text, a pattern, or an image,
   wherein the temperature dependent material is configured to transition between a first appearance and a second appearance responsive to the increase of the temperature of at least a portion of the shell, and
   wherein the permanent ink layer becomes more visible when the temperature dependent material transitions at temperatures above a transition temperature.

2. The smoking article of claim 1, wherein:
   the temperature dependent material is reversible such that the label is capable of transitioning from the first appearance to the second appearance and back to the first appearance as the temperature of the label rises above a transition temperature and then cools to below the transition temperature.

3. The smoking article of claim 1, wherein the temperature dependent material is a thermochromatic ink which transitions from substantially opaque to substantially transparent at temperatures above a transition temperature.

4. The smoking article of claim 1, wherein:
   the permanent ink layer is positioned under the temperature dependent material, and
   the permanent ink layer becomes visible when the temperature dependent material becomes substantially transparent at temperatures above the transition temperature.

5. The smoking article of claim 1, wherein:
   the permanent ink layer is positioned in front of the temperature dependent material but is substantially the same color as the temperature dependent material at temperatures below a transition temperature, and
   the permanent ink layer becomes more visible when the temperature dependent material changes appearance at temperatures above the transition temperature.

6. The smoking article of claim 1, wherein the temperature dependent material comprises a wax material that melts at temperatures above a transition temperature.

7. The smoking article of claim 1, wherein the label further comprises an intermediate film layer disposed between the base film and the cover film.

8. The smoking article of claim 1, wherein:
   at least one of the base film and the cover film comprises at least one of cellulose acetate and polylactic acid.

9. The smoking article of claim 1, wherein:
   the heat source is a non-electric heating element;

the consumable substance comprises shredded tobacco leaves;
the shell comprises wrapping paper; and
the label is attached to an outside of the shell in a location corresponding with the consumable substance.

10. A heat-not-burn cigarette, comprising:
a heating element configured to generate heat;
a filter configured for insertion into a user's mouth;
tobacco leaves disposed between the heating element and the filter;
wrapping configured to surround the heating element and the tobacco leaves; and
a label attached to the wrapping, wherein the label comprises:
a base film,
a cover film,
a heat-responsive material disposed between the base film and the cover film and adapted to change an appearance thereof responsive to the generated heat, and
a permanent ink layer applied to at least one of the base film and the cover film in the form of text, a pattern, or an image,
wherein the permanent ink layer becomes more visible when the heat-responsive material transitions at temperatures above a transition temperature.

11. The cigarette of claim 10, wherein the heat-responsive material is a thermochromatic ink.

12. The cigarette of claim 11, wherein the thermochromatic ink has a transition temperature between about 37° C. and about 65° C. such that the thermochromatic ink becomes transparent during use of the cigarette due to heat produced by the heating element, to alter the appearance of the label.

13. The cigarette of claim 10, wherein:
the permanent ink layer is positioned under the heat-responsive material, and
the permanent ink layer becomes visible when the heat-responsive material becomes substantially transparent at temperatures above the transition temperature.

14. The cigarette of claim 10, wherein:
the permanent ink layer is positioned in front of the heat-responsive material, but is substantially the same color as the heat-responsive material at temperatures below the transition temperature, and
the permanent ink layer becomes more visible when the heat-responsive material changes appearance at temperatures above the transition temperature.

15. The cigarette of claim 10, wherein the heat-responsive material is a phase-change material.

16. The cigarette of claim 15, wherein the phase-change material is a wax.

17. A smoking article comprising:
a shell defining an interior space;
a consumable substance within the interior space;
a heat source effective to increase the temperature of at least a portion of the shell; and
a label attached to at least a portion of the shell, the label comprising:
a base film,
a cover film, and
a temperature dependent material disposed between the base film and the cover film, the temperature dependent material comprising a wax material that melts at temperatures above a transition temperature,
wherein at least one of base film and the cover film is embossed with a diffractive grating, and
wherein the temperature dependent material is configured to transition between a first appearance and a second appearance responsive to the increase of the temperature of at least a portion of the shell.

18. The smoking article of claim 17, wherein the label further comprises a metallic coating applied to at least one of the base film and the cover film.

19. A heat-not-burn cigarette, comprising:
a heating element configured to generate heat;
a filter configured for insertion into a user's mouth;
tobacco leaves disposed between the heating element and the filter;
wrapping configured to surround the heating element and the tobacco leaves; and
a label attached to the wrapping, wherein the label comprises:
a base film embossed with a diffractive grating,
a cover film,
a heat-responsive material disposed between the base film and the cover film and adapted to change an appearance thereof responsive to the generated heat.

20. The cigarette of claim 19, wherein the label further comprises a metallic coating applied to at least one of the base film and the cover film.

21. A smoking article comprising:
a shell defining an interior space, the shell being a transparent material;
a consumable substance within the interior space, the consumable substance being in the form of an aerosol precursor;
a heat source in the form of an electric heating element effective to increase the temperature of at least a portion of the shell; and
a label attached to at least a portion of the shell so that the label is positioned adjacent the heating element within the shell, the label comprising:
a base film,
a cover film,
a temperature dependent material disposed between the base film and the cover film,
wherein the temperature dependent material is configured to transition between a first appearance and a second appearance responsive to the increase of the temperature of at least a portion of the shell.

* * * * *